United States Patent
Chen et al.

[19]

[11] Patent Number: 5,848,226
[45] Date of Patent: Dec. 8, 1998

[54] PRIORITIZED DATA TRANSFER THROUGH BUFFER MEMORY IN A DIGITAL PRINTING SYSTEM

[75] Inventors: Steven E. Chen, Penfield; Michael C. Lacagnina, Walworth, both of N.Y.

[73] Assignee: Xerox Corporation, Hamford, Conn.

[21] Appl. No.: 658,286

[22] Filed: Jun. 3, 1996

[51] Int. Cl.[6] .................................................. G06F 15/00
[52] U.S. Cl. ............................................................ 395/114
[58] Field of Search ...................... 395/101, 106, 395/109, 111, 112, 113, 114, 115, 117; 345/302, 115, 344; 358/500, 501, 530, 401, 404, 407, 409, 412, 437; 370/229, 252, 270

[56] References Cited

U.S. PATENT DOCUMENTS

| | | | |
|---|---|---|---|
| 5,125,071 | 6/1992 | Ozeki | 345/352 |
| 5,333,276 | 7/1994 | Solari | 395/561 |
| 5,420,696 | 5/1995 | Wegeng et al. | 358/408 |
| 5,487,061 | 1/1996 | Bray | 370/252 |
| 5,502,804 | 3/1996 | Butterfield et al. | 395/147 |
| 5,649,157 | 7/1997 | Williams | 395/478 |

*Primary Examiner*—Scott Rogers
*Assistant Examiner*—Gabriel I. Garcia
*Attorney, Agent, or Firm*—R. Hutter

[57] ABSTRACT

A system for retrieving data representative of individual page images to be printed from a disk drive utilizes a priority system in which individual software entities within the printing apparatus compete for functional access to the hard-drive memory. Different elements, such as the decomposer, and other software entities within the control system are assigned priorities, and commands from the various elements and software entities are executed by the control system in order of the priority of their sources.

10 Claims, 2 Drawing Sheets

PRIORITIZED DATA TRANSFER THROUGH BUFFER MEMORY IN A DIGITAL PRINTING SYSTEM

CROSS-REFERENCE TO RELATED APPLICATIONS

Cross-reference is made to the following co-pending U.S. patent applications, assigned to the assignee hereof: Ser. No. 08/550,320, entitled "Architecture for a Digital Printer with Multiple Independent Decomposers," and Ser. No. 08/550,312, entitled "System for Balancing CPU Demands in a High-Volume Print Server," both filed Oct. 30, 1995.

FIELD OF THE INVENTION

The present invention relates to a method and apparatus for the rapid transfer of large quantities of digital data from a decomposer to image hardware in the context of high-speed digital printing, such as with a high-volume "laser printer."

BACKGROUND OF THE INVENTION

High-speed digital printing presents unique requirements to data-processing equipment. For example, to operate a printing apparatus which is designed to output over 100 page-size images per minute, the ability to make the desired image data to print a particular page available to the printing hardware requires very close tolerances in the management of the "overhead" when data is transferred from a memory and applied to the printing hardware. A typical letter-sized page image at 600 spi resolution, in a format suitable to be submitted to printing hardware, is typically of a size of about 4 MB; when printing hardware demands the image data to print the particular page image, this 4 MB image data must be accessed from memory within a time frame of approximately 300 milliseconds.

As is known in the art of digital printing, these large quantities of data must be processed in numerous sophisticated ways. For example, image data in a page description language (PDL), such as HP-PCL or PostScript™, must be decomposed into raw digital data, and this raw digital data may often have to be compressed and decompressed at least once before the data reaches the printing hardware. In addition, in a high-volume situation where hundreds of different pages are being printed in one job, the particular set of image data corresponding to a page to be printed at a given time-window must be carefully managed.

One site within a digital printing apparatus which is particularly crucial for the rapid and orderly transfer of image data is the portion of the system between the decomposer, which outputs bitmapped images, and the printing hardware on which the digital signals embodying the bitmap images operate, such as a modulating laser or ejectors in an ink-jet printhead. In a high-speed printing apparatus with blank pages being presented to the image output terminal at a high rate, it is imperative that the necessary data to print a desired image is available to the image output terminal at a particular time. Simultaneously, however, if each page image to be printed represents up to 4 MB of memory, it will be apparent that there is competition for resources in the area of the system between the decomposer and the image output terminal: there is competition for bandwidth, in submitting data to the image output terminal, and competition for memory, in retaining a usable supply of image data to be delivered to the image output terminal when needed.

DESCRIPTION OF THE PRIOR ART

It is a common design solution in digital printing to temporarily compress image data output from a decomposer, and retain this compressed image data briefly in a disk memory, such as a hard drive, until the precise moment in which that particular image data is required approaches. Just before the particular image data is required, the compressed image data is decompressed and submitted to the image output terminal. U.S. Pat. No. 5,420,696 and U.S. Pat. No. 5,502,804 are two patents which generally disclose these concepts in the context of transmission of high-resolution image data, as well as the two pending patent applications referenced above.

The present invention proposes a system by which the temporary compression and storage of individual page images and other data useful to a digital printing apparatus may be optimally managed.

SUMMARY OF THE INVENTION

According to one aspect of the present invention, there is provided an apparatus, operable via an operating system, for transferring image data from a data source to printing hardware. A memory retains image data. A marker, a software entity for conveying image data to the printing hardware in real time, is capable of outputting commands to the operating system for retrieving image data from the memory. A second software entity is also capable of outputting commands to the operating system. Control means assign a priority to a command output by the marker, compare the priority of a command output by the marker to a priority of a command output by the second software entity, and cause the control system to execute the command having a higher priority.

According to another aspect of the present invention, there is provided an apparatus, operable via an operating system, for transferring image data from a data source to printing hardware. A memory retains image data. A marker, a software entity for conveying image data to the printing hardware in real time, is capable of outputting commands to the operating system for retrieving image data from the memory. A second software entity is also capable of outputting commands to the operating system. Control means cause the operating system not to execute commands from the second software entity unless all pending commands from the marker for retrieving image data from the memory have been executed.

DETAILED DESCRIPTION OF THE INVENTION

Figure 1:
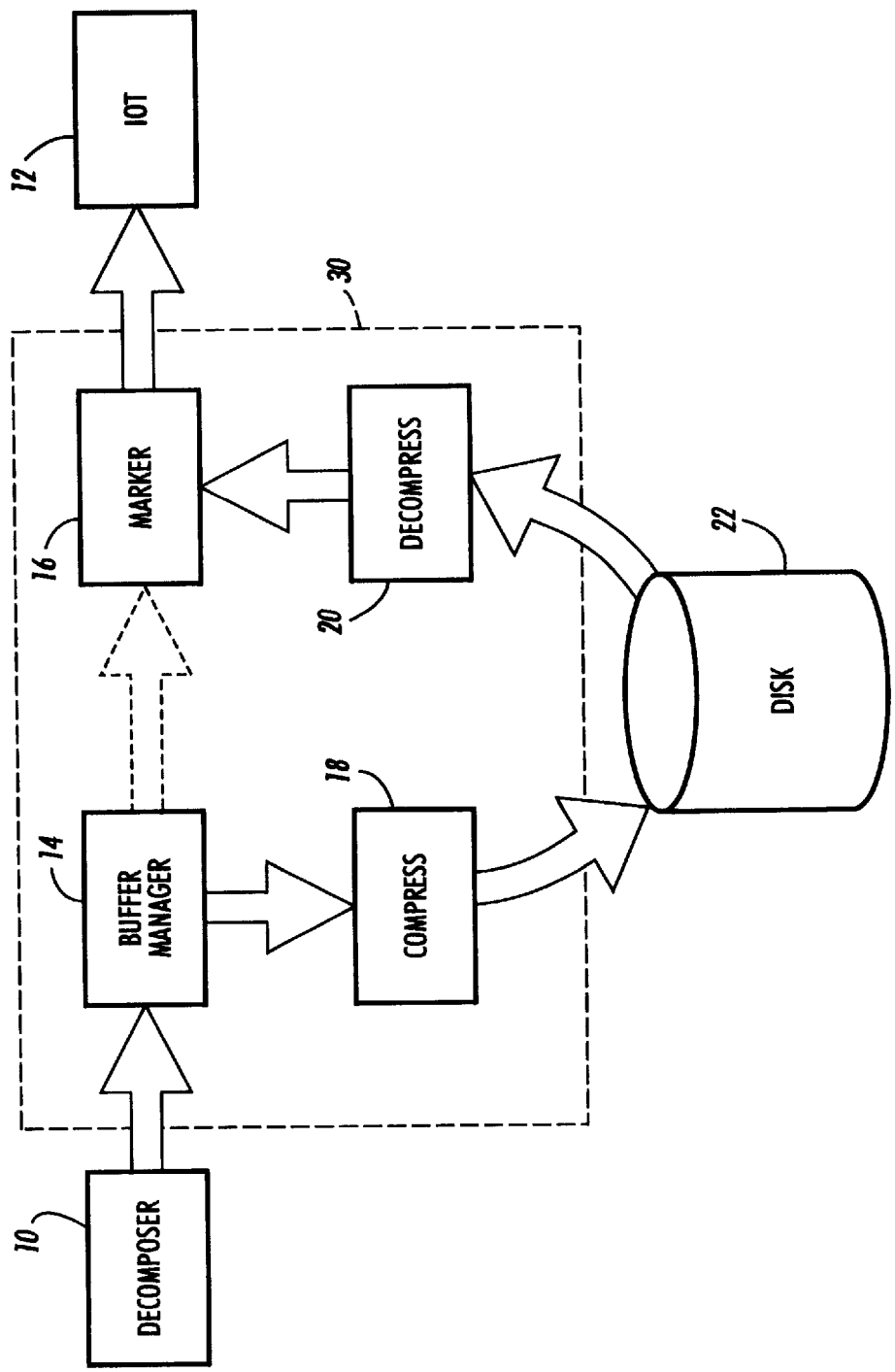
FIG. 1 is a systems view showing the essential elements and software entities on which the present invention is operative.

FIG. 1 is a systems diagram showing the essential elements of a certain specific portion of a digital printing system, in which the present invention may be incorporated. The basic elements which are common in current designs of digital printing systems include an image data source, such as in the form of decomposer 10, and printing hardware, generally indicated as an image output terminal, or IOT, 12. Decomposer 10, which may be one of several decomposers in a printing system, outputs image data in the form of digital signals which are generally directly operative of hardware within IOT 12. In the context of a digital copier, however, there may be included, alternately or in addition to decomposer 10, a data source in the form of an image input terminal, such as a digital hard-copy scanner. IOT 12 can be any type of printing hardware known in the art, such as a modulating laser or ionographic printhead in an electrostatographic apparatus, or a set of individual ejectors in an ink-jet printhead. Decomposers such as 10 are well-known in the art, and many are commercially available, such as HP-PCL, Adobe® PostScript™, and their various emulations.

Interposed between decomposer 10 and IOT 12 is a set of elements which carry out the technique of the present invention. The various elements shown in FIG. 1 represent distinct functions, but it will be apparent that the specific functions of the elements can be combined in different programs or operating systems, depending on a specific implementation of the invention. For present purposes, decomposer 10 submits digital signals representing bit-mapped images directly to a buffer manager indicated as 14. The function of buffer manager 14 is to determine, based on a number of external considerations, whether the digital signals should be sent more or less directly to IOT 12 for immediate printing, or instead should be compressed and temporarily stored in memory until a precise moment in which the data, after decompression, is submitted to IOT 12.

Marker 16 is an entity, which may be embodied in software, for requesting non-compressed or decompressed image data for submission to IOT 12 in real time. In general, in a high-speed, high-volume digital printing apparatus, the IOT 12 must be consistently "fed" with image data with which to create images. If a particular set of image data for printing a particular desired page image is not available, there will be either a fault in the system, or at least there will be a performance cut because the printing hardware must skip the printing of a particular page. It is thus the function of marker 16 to ensure that desired image data is constantly supplied to IOT 12.

Also shown in FIG. 1 is a compression algorithm 18 and a decompression algorithm 20. Such algorithms are well-known in the art for compressing image data so that the data will take up less space in a memory. Depending on a particular implementation and nature of the image having data to be compressed, compression ratios for image data output from decomposer 10 can be from 4:1 to as high as 20:1. Similarly, the function of decompression algorithm 20 is to undo the compression algorithm 18, so that the decompressed data can be given to marker 16 for submission to IOT 12.

As mentioned above, buffer manager 14 determines, based on various considerations, whether certain sets of image data, representing page images, output from decomposer 10 should be sent directly through marker 16 to IOT 12, or should be temporarily compressed by compression algorithm 18 and temporarily stored in a disk memory, such as shown as 22, until needed. There are many possible outside considerations which determine the operation of buffer manager 14, but they are not directly relevant to the present invention. For example, a digital printing system may retain a quantity of RAM (not shown) for temporarily buffering uncompressed image data between decomposer 10 and marker 16, and the fullness of this RAM may determine whether buffer manager 14 decides to compress some of the image data and store it on disk 22. Such an arrangement is described, for example, in the patent disclosure entitled "System for Balancing CPU Demands in a High-Volume Print Server," referenced above. However, the present invention is concerned primarily with data stored in compressed form in disk 22.

In a preferred embodiment of the present invention, disk memory 22 is in the form of a hard drive. The memory within a hard drive is organized as a set of numbered "cylinders," each cylinder representing a fixed location in the memory. These cylinders are functionally analogous to the "tracks" in a vinyl phonographic record, and any particular cylinder on the disk is accessed by physically moving or activating a magnetic read head (or, conceivably, a laser head in a CD-ROM) to the desired location in the memory. In disk 22, the various cylinders are typically numbered sequentially, such as from 0 to 1246, and are accessed by number.

As shown in FIG. 1, buffer manager 14, marker 16, compression algorithm 18, and decompression algorithm 20 are all ultimately controlled by an operating system, such as UNIX, which at the very least ties the functionality of these various elements together. The UNIX "kernel" underlying all of the elements is indicated as 30. It is a desirable function in UNIX, when reading data from a hard drive such as 22, to "sweep" through the memory and read out the contents of a set of cylinders in their numerical order for fastest downloading. Indeed, if the desired result of the digital printing system is to maximize the overall average speed of throughput between decomposer 10 and IOT 12, downloading the data by a "sweep" through disk 22 would be desirable. However, in many digital printing situations, maximizing the total average speed of throughput for all data passing through the system is not the ultimate best consideration. Rather, a more precisely-defined optimal system is one in which a particular set of image data required for printing a particular page image is available when necessary, and, if needed, in such a manner that the required image data "jumps to the head of the line." In brief, in this particular digital printing context, flexibility in obtaining a particular desired image at a given time is more important than maximizing total average throughput.

To this end, the present invention provides a system by which retrieval of individual page images from disk 22 is performed according to a priority system.

In order to carry out the objectives of enabling a flexible system for retrieving image data from disk 22 as needed, the present invention proposes a system of priorities, embodied in a program operating off of the control system 30, which assigns a priority to particular commands, based on which agent within the printing system requested the command. It is a convenience of UNIX, for example, that particular requests, such as to retrieve certain data from disk 22, can be traced to specific software entities, such as decomposer 10, buffer manager 14, or marker 16, as they are made. According to the present invention, certain software entities, in particular the marker 16, will always have their commands responded to before commands from another software entity such as buffer manager 14.

Figure 2:
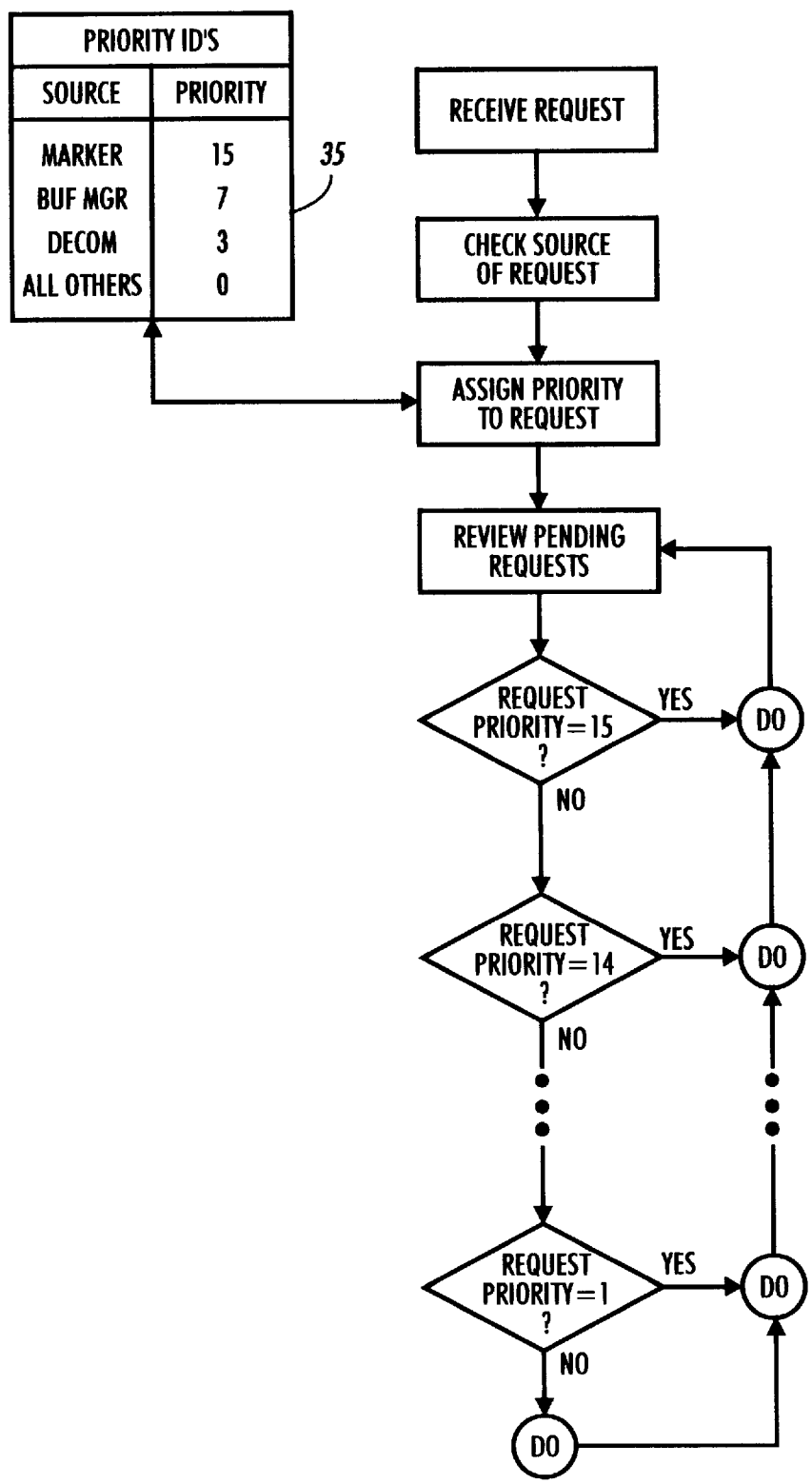
FIG. 2 is a flowchart, together with a look-up table, illustrating the technique according to the claimed invention.

FIG. 2 is a flowchart showing the operation of the prioritization system according to the present invention. The program embodying the flowchart shown in FIG. 2 would be operated on a program which controls the various software entities such as buffer manager 14 and marker 16. When a particular command is received, in particular a request to retrieve a certain set of image data from disk 22, this request is scrutinized by its source, whether the marker 16, buffer manager 14, decomposer 10, or some other software entity not mentioned here. Once the source of the request or other command is determined, a priority is assigned to the request or command. According to the present invention, these priorities are assigned by a look-up table, indicated as 35, listing "priority ID's" for each software entity. In the convention shown in FIG. 2, the higher the assigned priority number in table 35, the higher the priority of the request or other command.

In a particular embodiment of the present invention, there are shown sixteen possible levels of priority, numbered 0–15, although it is conceivable to have much fewer levels, such as two (e.g., "fast" and "slow"), or many more possible levels of priorities. As shown in the particular embodiment, the table 35 assigns the highest priority, 15, to requests or other commands from marker 16. Generally, this would make sense because the highest responsibility of a digital printing system is to keep the IOT 12 "fed" with image data, so that blank pages will not be accidentally created. Further as shown in table 35, buffer manager 14 is assigned a relatively lower priority of 7, and the decomposer 10 is assigned a priority of 3. Typically, any other software entity not listed in the table 35 is automatically assigned the lowest priority, in this case 0. It will be evident that the various priority rankings of different software entities can be fine-tuned depending on the overall desired performance of the printing apparatus.

Returning to the flowchart in FIG. 2, once priorities are assigned to incoming request for data retrieval or other commands, the system is designed to execute all of the commands of the highest available priority before descending to execute commands of lower priority. As shown in FIG. 2, requests assigned a priority of 15, which have come from marker 16, are always performed first, and no other commands are executed until all of the commands from marker 16 are executed. As shown in the flowchart, incoming requests or other commands are checked for progressively lower priorities before they are executed, and once a command of a particular priority is executed, the process starts again, so that pending higher-priority commands are always executed and lower-priority commands always have to wait until there are no more higher-priority commands pending. In the context of the competition of marker 16 and buffer manager 14 for execution of commands therefrom, this priority relationship is desirable.

In FIG. 2, the execution of a particular command or request is simply indicated as "do"; commonly, a request such as received in the flowchart of FIG. 2 is a request to retrieve a particular set of image data from disk 22 for submission to IOT 12. However, other commands for other purposes can be similarly scrutinized by priority. For example, if a maintenance system within the printing apparatus is operative to send a signal to an external control system after every one thousand prints are made, such a request would have to be assigned a priority (from 0 to 15) and thus forced to compete with the commands, for example, originating from the marker 16 or buffer manager 14.

It should be noted that the priority system of the present invention is not necessarily related to a job priority system, wherein different jobs submitted to the printing apparatus in general are prioritized for an order of output from the printing apparatus. Rather, the present invention is preferably directed to a more immediate level of submitting page images to the IOT 12 within a particular print job.

One incidental effect of the system of the present invention is that the "sweeping" of retrieving data in a sequential fashion from disk 22, which is most desirable from the standpoint of overall throughput speed in a UNIX system, can be superseded. The system of the present invention is generally indifferent to precisely at which cylinder within disk drive 22 a particular compressed page image is placed; a head or pointer operating relative to the disk drive 22 will typically be commanded to skip around randomly to different locations in the disk drive to retrieve individual page images as needed, wherever they are located on disk 22. While admittedly the skipping-around of the position of a head relative to disk 22 consumes time which is not consumed if the disk drive is read out in "sweeping" fashion, the specific needs of retrieving specific quantities of image data override the time advantage in total throughput facilitated by a "sweeping" read out of page images from disk drive 22.

While the invention has been described with reference to the structure disclosed, it is not confined to the details set forth, but is intended to cover such modifications or changes as may come within the scope of the following claims.

We claim:

1. An apparatus, operable via an operating system, for transferring page image data from a data source to printing hardware, comprising:

a memory for retaining page image data;

a marker, the marker being a software entity for conveying page image data to the printing hardware in real time, the marker being capable of outputting commands to the operating system for retrieving image data from the memory;

a buffer manager, for determining, at a given time, whether page image data output from the data source should be sent to the memory or made immediately available to the marker;

a second software entity capable of outputting commands to the operating system; and control means for assigning a priority to a command output by the marker, comparing the priority of a command output by the marker to a priority of a command output by the second software entity, and executing the command having a higher priority in said comparison, said comparison influencing whether the buffer manager sends page image data output from the data source to the memory or to the marker and having an effect of causing the buffer manager to submit page images to the marker at substantially regular time intervals and minimizing missed opportunities for printing a page image.

2. The apparatus of claim 1, the control means further comprising means for determining, for a given command submitted thereto, an identity of a software entity which is the source of the command, and assigning a priority to the given command based on the determined source thereof.

3. The apparatus of claim 1, wherein the second software entity comprises the buffer manager, the buffer manager being operable to determine whether image data received from the data source should be submitted to the memory.

4. The apparatus of claim 1, wherein the second software entity comprises a compression algorithm for compressing image data being submitted to the memory.

5. The apparatus of claim 1, wherein the second software entity comprises a decompression algorithm for decompressing image data being retrieved from the memory.

6. The apparatus of claim 1, wherein the second software entity comprises a decomposer associated with the data source.

7. An apparatus, operable via an operating system, for transferring page image data from a data source to printing hardware, comprising:

a memory for retaining page image data;

a marker, the marker being a software entity for conveying page image data to the printing hardware in real time, the marker being capable of outputting commands to the operating system for retrieving image data from the memory;

a buffer manager, for determining, at a given time, whether page image data output from the data source should be sent to the memory or made immediately available to the marker;

a second software entity capable of outputting commands to the operating system; and control means for causing the operating system to not execute commands from the buffer manager or the second software entity unless all pending commands from the marker for retrieving image data from the memory have been executed;

the control means having an effect of causing the buffer manager to submit page images to the marker at substantially regular time intervals and minimizing missed opportunities for printing a page image.

8. The apparatus of claim 7, wherein the second software entity comprises a compression algorithm for compressing image data being submitted to the memory.

9. The apparatus of claim 7, wherein the second software entity comprises a decompression algorithm for decompressing image data being retrieved from the memory.

10. The apparatus of claim 7, wherein the second software entity comprises a decomposer associated with the data source.

* * * * *